United States Patent [19]

Bertelsen

[11] Patent Number: 4,530,545
[45] Date of Patent: Jul. 23, 1985

[54] SEGMENTED AIR-TRACK APPARATUS

[76] Inventor: William R. Bertelsen, 2720 31st Ave., Rock Island, Ill. 61201

[21] Appl. No.: 437,311

[22] Filed: Oct. 28, 1982

[51] Int. Cl.³ .............................................. B62D 55/18
[52] U.S. Cl. ........................................ 305/16; 305/34; 305/35 R
[58] Field of Search .................... 305/16, 25, 34, 35 R

[56] References Cited

U.S. PATENT DOCUMENTS

| | | | |
|---|---|---|---|
| 3,146,035 | 8/1964 | Bonmartini | 305/35 R X |
| 3,170,533 | 2/1965 | Fewel et al. | 305/34 X |
| 3,244,458 | 4/1966 | Frost | 305/34 |
| 3,427,078 | 2/1969 | Parsons | 305/34 X |

FOREIGN PATENT DOCUMENTS 553149  5/1977  U.S.S.R. ............................... 305/34

Primary Examiner—David A. Scherbel
Attorney, Agent, or Firm—Lockwood Alex Fitzgibbon & Cummings

[57] ABSTRACT

A buoyant-wheeled vehicle for operation over difficult terrain utilizing low ground pressure supports combined in a crawler configuration. A plurality of individual air-pressurized, inflatable casing units are interconnected to each other and supported for movement in an endless path of movement to form the air-track crawler on which the vehicle is supported.

6 Claims, 16 Drawing Figures

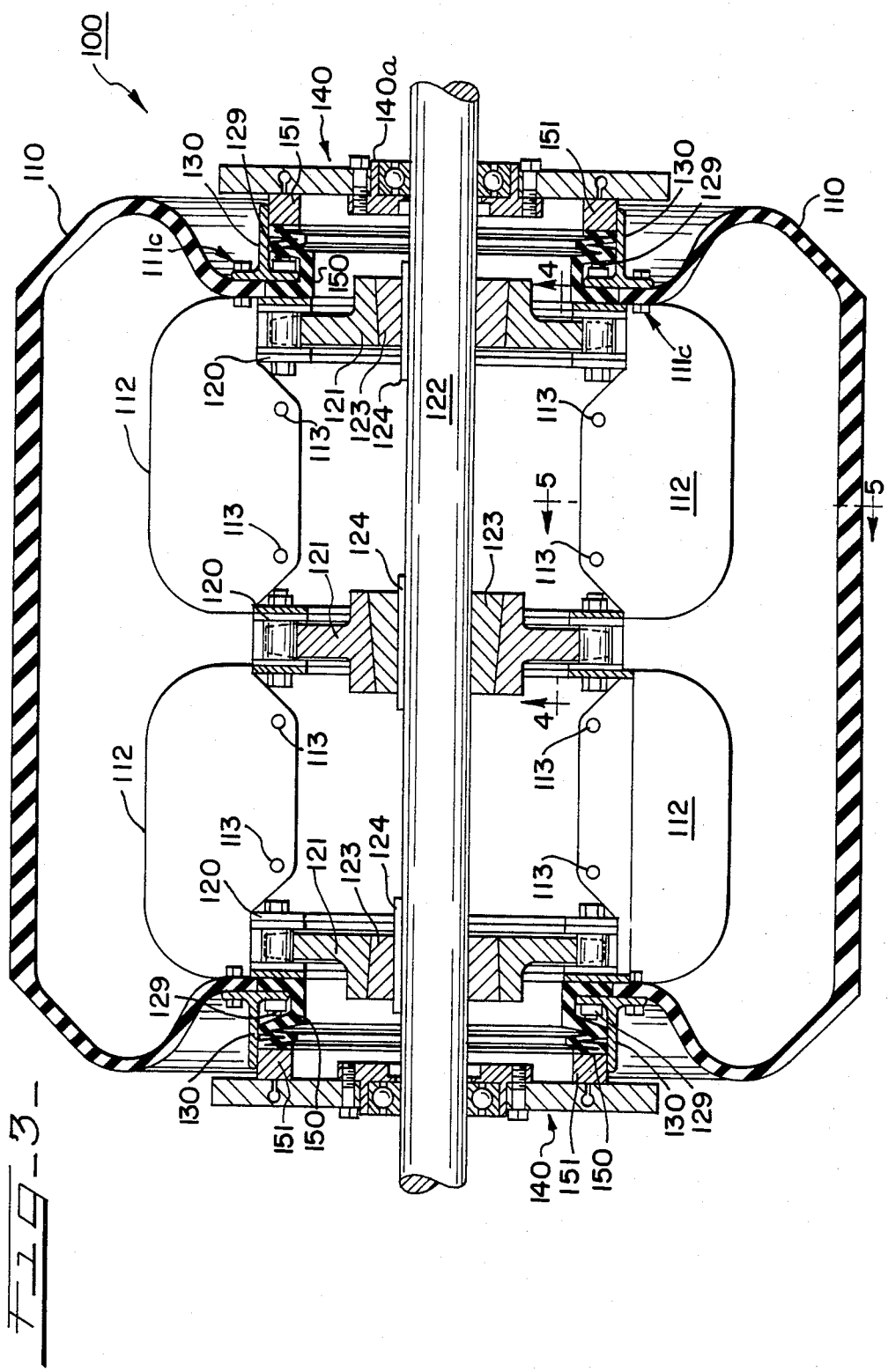

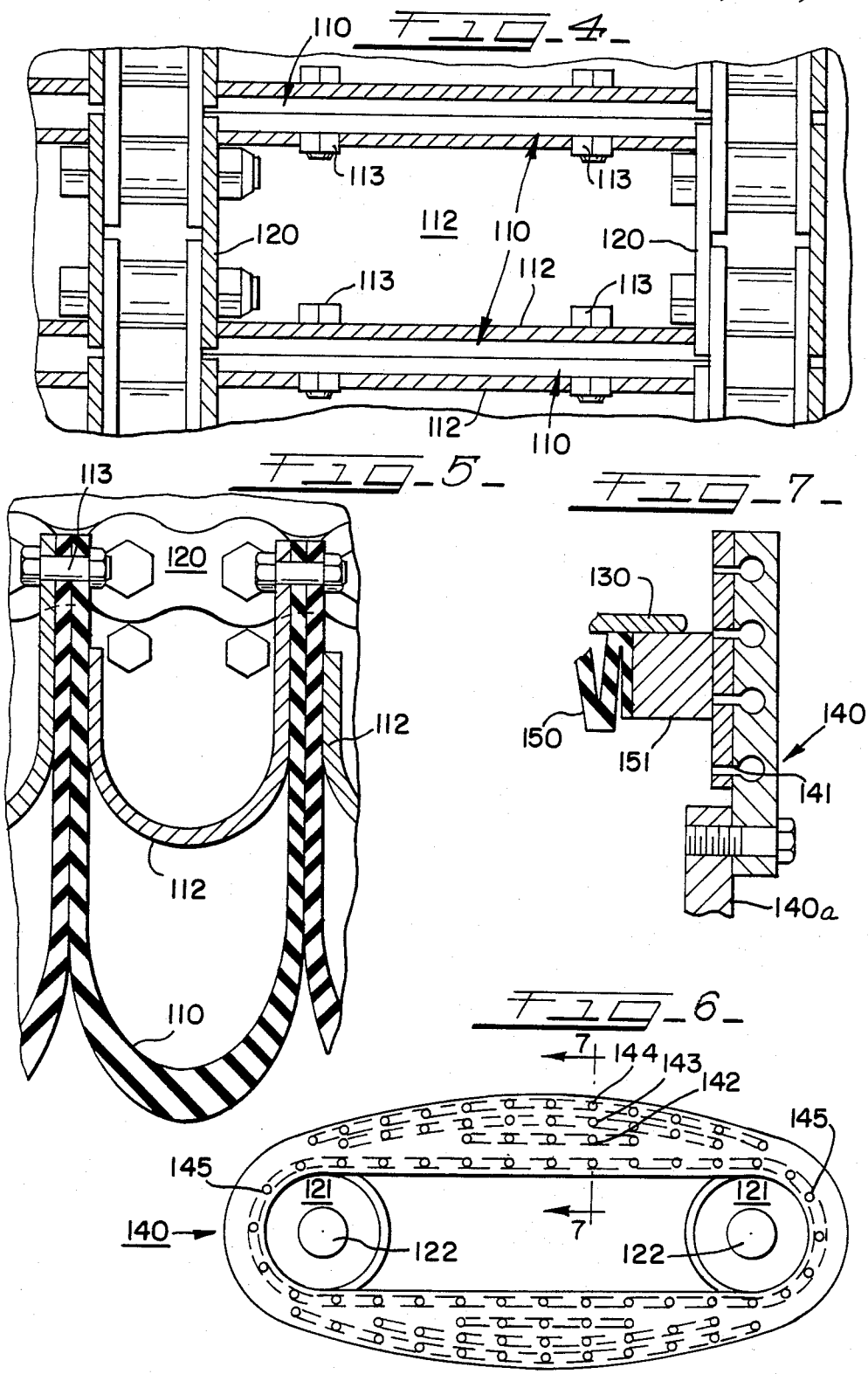

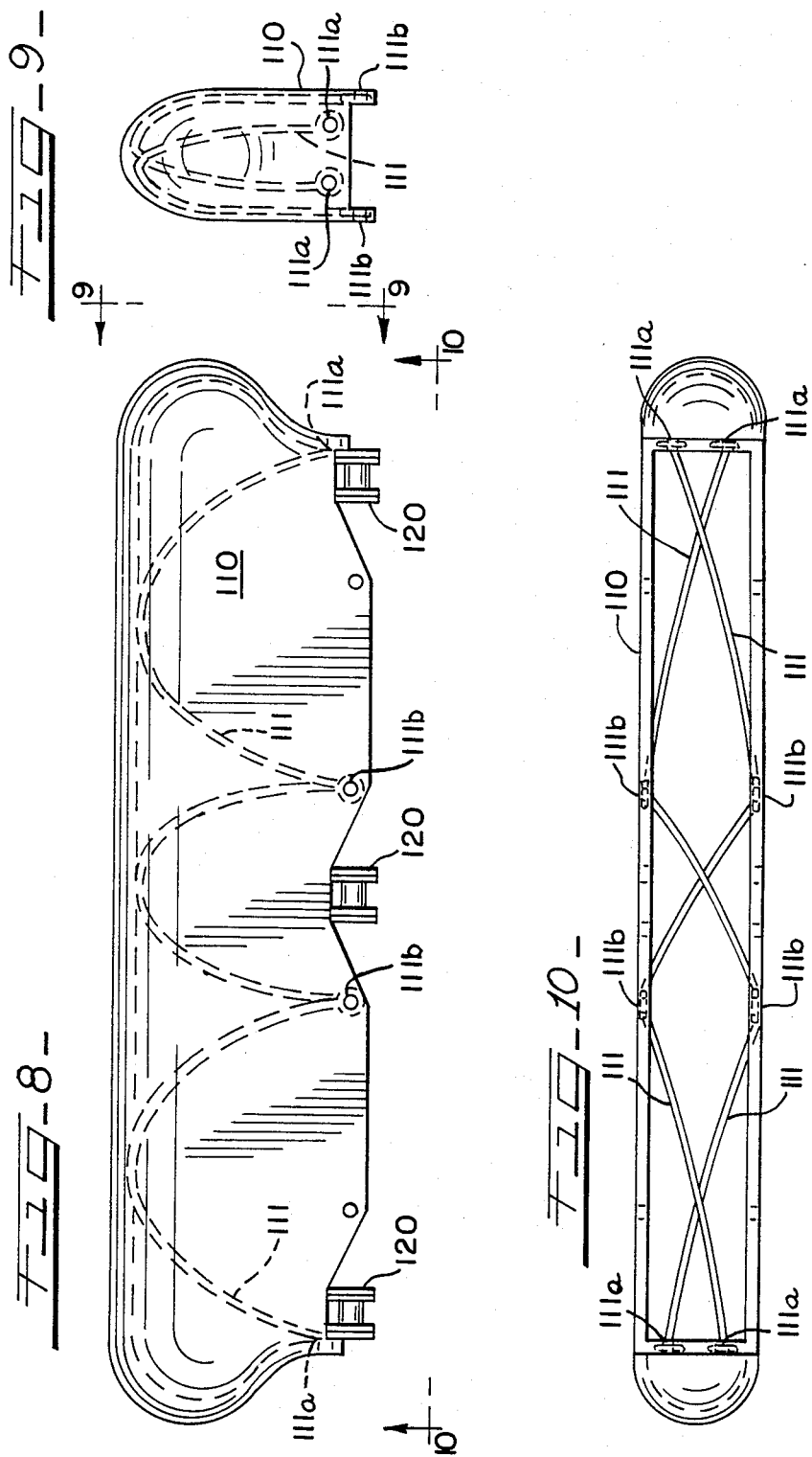

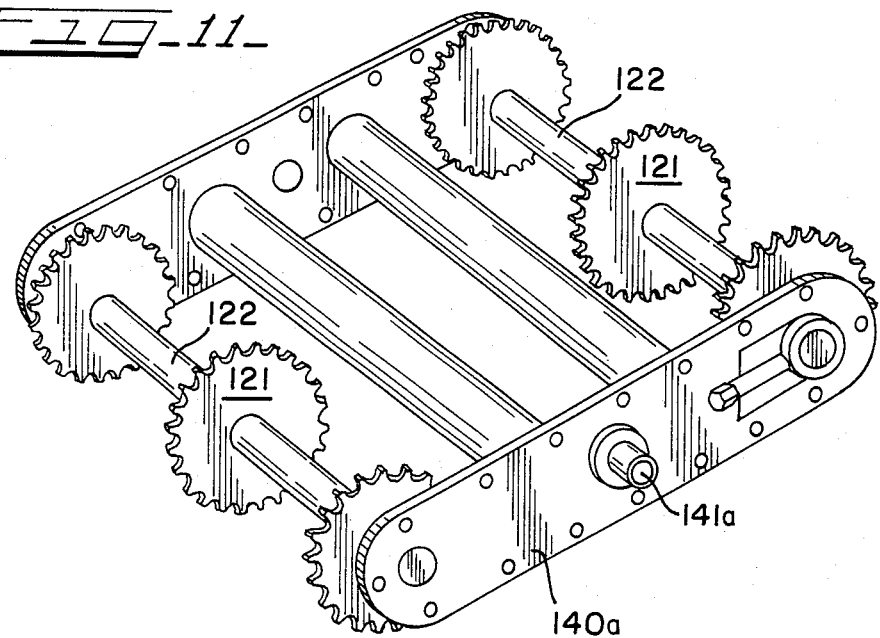
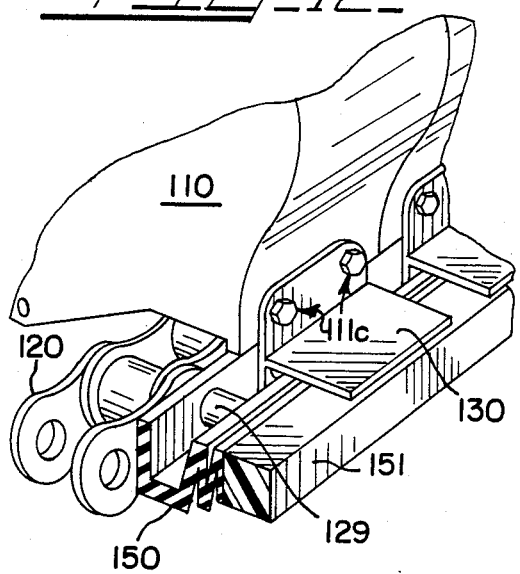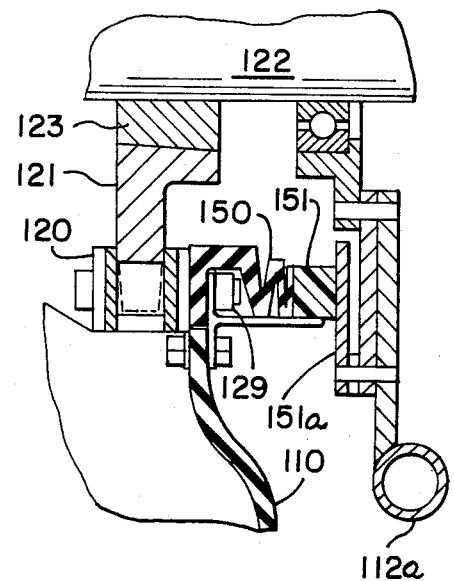

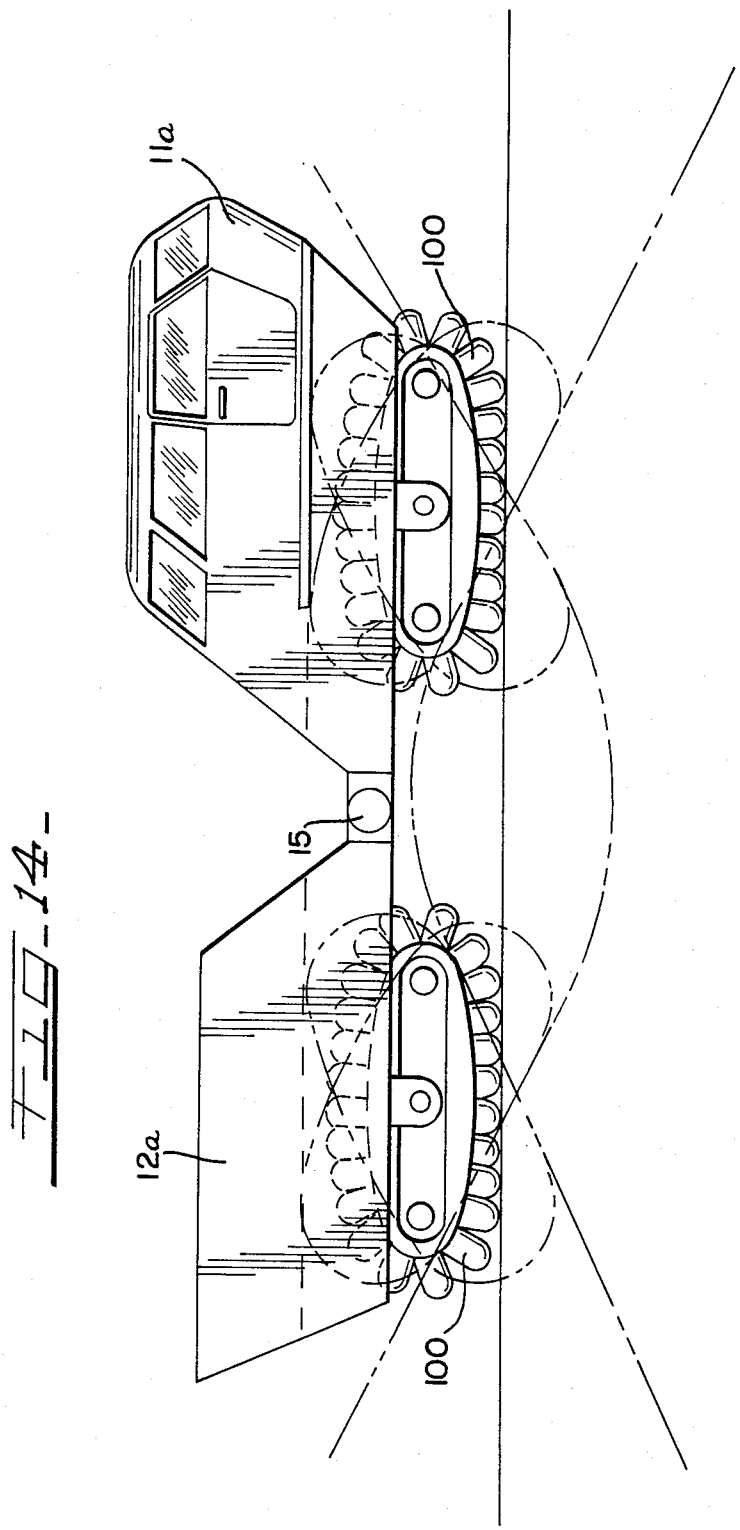

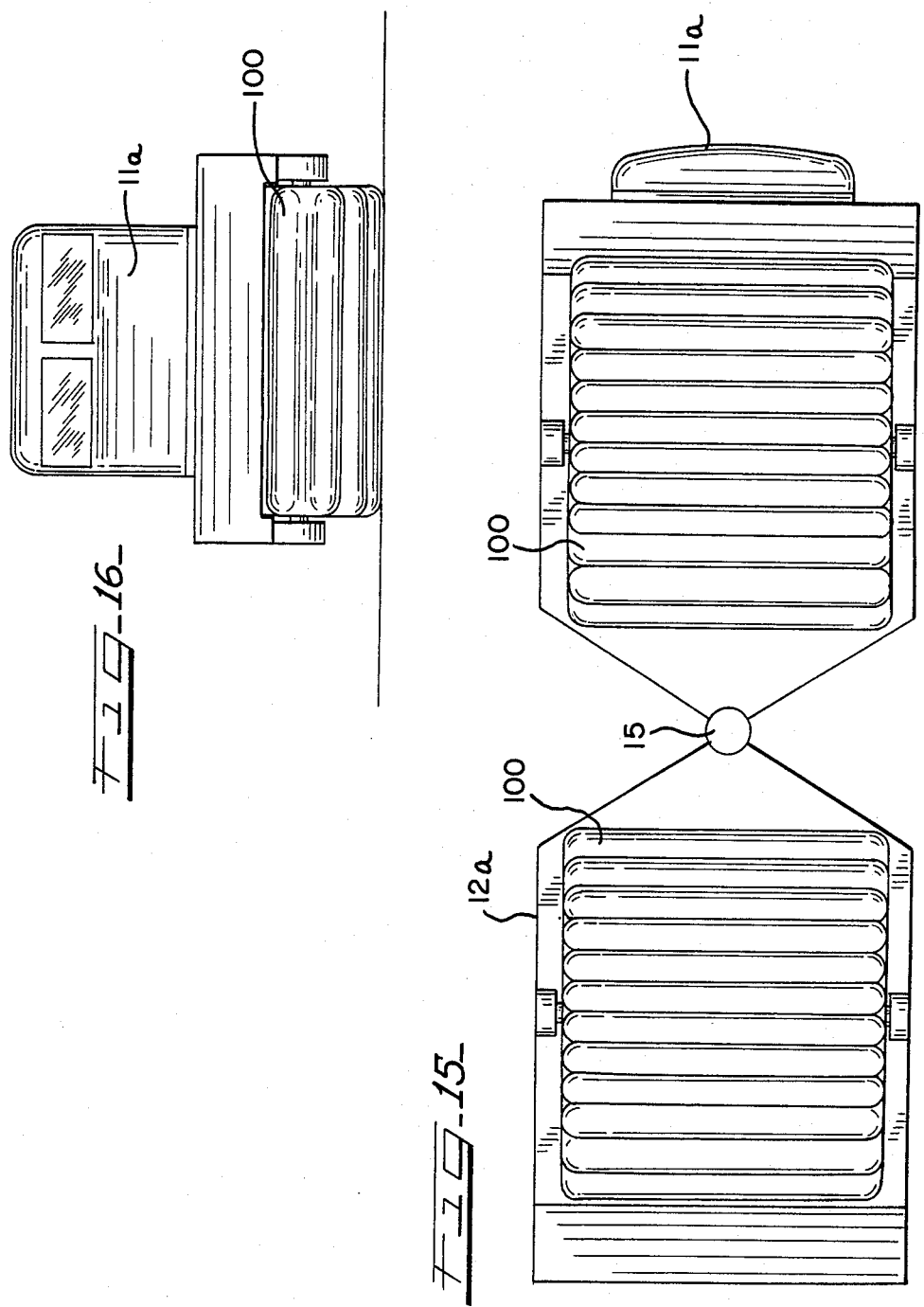

SEGMENTED AIR-TRACK APPARATUS

BACKGROUND OF THE INVENTION

This invention relates in general to buoyant-wheel vehicles and, in particular, to an improved all terrain vehicle.

More specifically, but without restriction to the embodiments shown and described, this invention relates to an all terrain vehicle utilizing a segmented air-track crawler to support the vehicle for movement over various terrain.

Due to the wide variations of terrain over which it is necessary to transport materials and people, various vehicles have been developed for movement over difficult terrain. Such vehicles must be capable of movement over not just land surfaces, but also water and combinations thereof under varying conditions and situations For example, sand beaches, marshes, mud flats, peat bogs, water, whether deep, shallow, or weed infested, ice, which may be over or under water, or ground, which due to cyclic weather conditions can vary between clinging mud and frozen tundra are but some examples over which such vehicles must traverse Supporting vehicles for movement over such difficult terrain can generally only be accomplished by the use of either an air-cushion vehicle or a buoyant-wheeled vehicle. While aircraft could certainly be used for operation over such terrain, their power requirements, and, therefore, energy consumption, are relatively high. In addition, the only type of aircraft which would be potentially suitable are helicopters which themselves could not be landed in much of this terrain. As a result, amphibious air cushion vehicles and buoyant-wheeled vehicles have proven to be very effective for use in these specialized circumstances. Both types of vehicles have very low ground pressure, and neither cause much disturbance to the surface over which they are operating, either from their means of support or propulsion.

The principal drawback of air-cushioned vehicles is the limitation to their grade climbing capability, and their inability to pass from one surface to another where the gradient between the level of the two surfaces exceeds a predetermined amount. These disadvantages are not present with a buoyant-wheeled vehicle which possesses considerable grade climbing capability, and the ability to pass from one surface level to another whether the surfaces be of the same or different materials. These buoyant-wheeled vehicles use low pressure tires, which are in effect trapped air cushions, which reduce ground pressure by increasing footprint area. However, such vehicles have disadvantages in that they have limited increase in footprint area, are expensive to build, replace and service. In addition, the use of such buoyant-wheeled vehicles requires a large single high silhouette casing tire which is difficult to service or replace in the field, and severe damage to such tires requires that the entire unit be replaced and the damaged casing discarded.

A vehicle described herein is capable of utilizing two 7'×7' tracks in tandem having 98 sq. ft. of weight bearing area covering almost the entire base of the vehicle. The vehicle will support 6115.2 pounds per foot of immersion in water, that means it will float one foot deep at 6115.2 pounds gross weight. Floating two feet immersed, the tandem 7'×7' dual track vehicle will carry 12,230.4 pounds gross weight. At internal track air pressures of 1 p.s.i. The above tandem track vehicle will carry 7 tons and float 27" immersed in water. At track pressures of 2, 3, 4, and 10 p.s.i., the vehicle will carry 14, 21, and 70 tons gross weight respectively.

SUMMARY OF THE INVENTION

It is, therefore, an object of this invention to improve vehicles for operation over difficult terrain.

Another object of this invention is to improve buoyant-wheeled vehicles.

A further object of this invention is to utilize a segmented buoyant-wheel in a crawler configuration.

These and other objects are attained in accordance with the present invention wherein there is provided a buoyant-wheeled vehicle for operation over difficult terrain utilizing low ground pressure supports combined in a crawler configuration.

DESCRIPTION OF THE DRAWINGS

Further objects of the invention, together with additional features contributing thereto and advantages accruing therefrom will be apparent from the following description of one embodiment of the invention, which is shown in the accompanying drawings, with like reference numerals indicating corresponding parts throughout:

FIG. 3 is a transverse cross sectional view of one of the segmented air-track crawler units to better illustrate the construction thereof;

FIG. 4 is a partial, longitudinal cross sectional view taken through line 4—4 of FIG. 3 of the segmented air-track crawler to illustrate the internal construction thereof;

FIG. 5 is a cross sectional view of the apparatus shown in FIG. 4 taken along lines 5—5;

FIG. 6 is a vertical planar internal view of a portion of the air bearing seal utilized in the segmented air-track crawler;

FIG. 7 is an enlarged cross sectional view of the apparatus shown in FIG. 6 taken along lines 7—7;

FIG. 8 is an enlarged view of one of the segments of the air-track crawler;

FIGS. 9 and 10 are additional views of the structure shown in FIG. 8 taken in the direction of lines 9—9 and 10—10, respectively;

FIG. 11 is a perspective view of the drive framework for a crawler unit;

FIGS. 12 and 13 are, respectively, enlarged perspective and cross sectional views of the sealing system used for an air-track unit;

FIG. 14 is a side profile view of another embodiment of a tandem air-track articulated crawler vehicle;

FIG. 15 is a bottom view of a tandem air-track articulated crawler vehicle of FIG. 14 showing full width crawler belts; and FIG. 16 is a front view of the tandem air-track vehicle.

DESCRIPTION OF THE PREFERRED EMBODIMENTS

Figure 1:
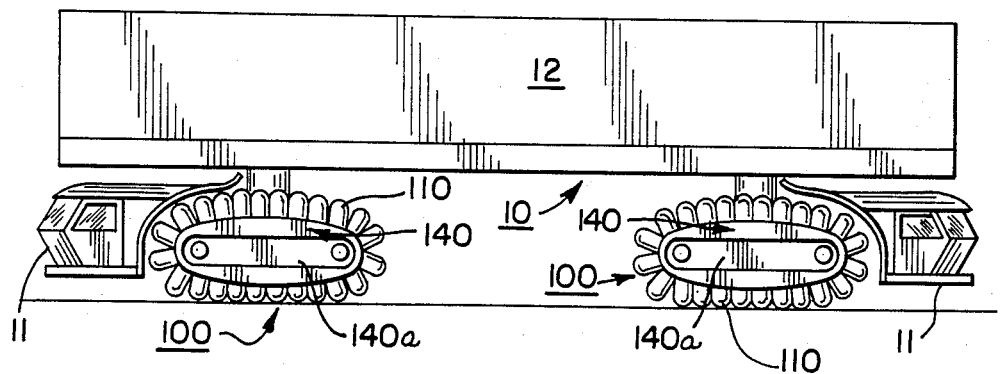
FIG. 1 is a side profile view of a vehicle utilizing a segmented air-track crawler for movement of the vehicle over difficult terrain.

Referring now to FIG. 1, there is shown a vehicle 10 for operating over difficult terrain which utilizes a plurality of segmented air-track crawlers 100 for propelling and carrying the vehicle over its supporting surface. An operator's compartment 11 is supported both fore and aft of the vehicle, and contains all of the operational controls for effecting vehicle movement and functions. The vehicle 10 includes a bed 12 in which materials may be carried, and at least four segmented air-track crawlers 100 to support the vehicle. Since these segmented air-track crawlers are identical to each other, only one is described in detail in the specification.

Figure 2:
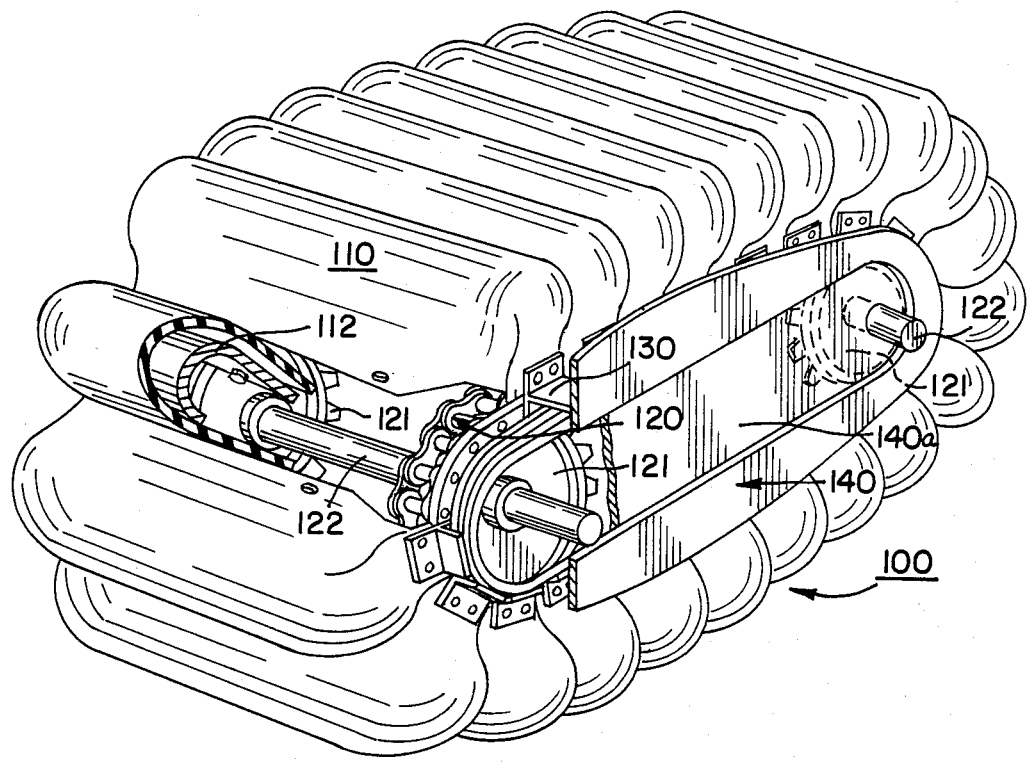
FIG. 2 is an enlarged perspective view of one of the segmented air-track crawlers with portions broken away to better illustrate the construction thereof.

The segmented air-track crawlers 100 which support the vehicle 10 for movement over the terrain, include a plurality of individual air-track segments 110 carried by a plurality of drive chains 120 which are supported for movement in an endless path of movement upon sprockets 121 rotatably supported upon shafts 122 and which define the run length. Each of the sprockets 121 are supported on the shafts 122 by suitable tapered bushings 123 and keyed 124 to the shaft for rotation therewith. As best shown in FIGS. 2 and 3, the individual air-track segments 110 are formed, for example, from a rubber material such as normally used for buoyant-wheeled vehicles, with each of the individual segments 110 being bolted to a T-shaped support member 130 to support an airtight sliding seal 151 therewith. The T-shaped supports 130 are also secured to the links of the drive chains 120 for a purpose hereinafter described.

The top of each air-track segment is maintained flat by means of an internal tension cable or cord 111 within each individual air-track segment 110 as best shown in FIGS. 8-10. The molded into the rubber, or integral, tension cable 111 is supported at one end 111a by a loop to a bolt 111c (FIG. 3) anchoring the air-track segment to the T-shape support member 130 with its other end 111b of the cable being secured to the opposite side of the segment to the skid rest bolt 111b. Maintaining the cable 111 under tension keeps the top of the air-track segment flat and prevents ballooning. Two central cables cross diagonally between the inside skid rest bolts.

Within the structure of the individual air-track segment 110, a pair of skid rests 112 (FIGS. 3, 4, and 5) are supported from the drive chains 120 and through bolted 113 between adjacent segments to form a support for the vehicle when the air pressure in the segmented air-track crawler unit is turned off. In this manner, when power is turned off, the vehicle will not come to rest on the sprockets 121, but will be supported by the plurality of skid rests 112.

Outside the air-track unit shown in FIG. 13 is an alternative external skid rest 112a located on both sides of the air-track unit and secured to the main frame 140a.

Air pressure for maintaining the desired ground pressure relationship is introduced into the segmented air-track crawler unit through an air pressure inlet 141a (FIG. 11), mounted in a frame 140a which communicates air pressure within the air-track crawler unit to the individual air-track segments 110. The individual air-track segments 110 forming tne segmented air-track crawler 110 (FIGS. 2 and 3), are fastened to the T-shaped supports 130, which in turn are fastened by the interlinking chain pins 129 to the chain 120. Chain pins 129 also fasten expandable bellows seal 150 having a Teflon, or other low friction material, sealing face 151 adhesively secured thereto. The individual air-track segments 110 are sealed to one another at their sides by means of the internal bolts 113 which also fasten the segments 110 to the skid rests 112 as shown in FIGS. 4 and 5. Teflon is a trademark of DuPont Corp. for a fluorocarbon product. The Teflon, or other low friction material, sealing face 151 is held in sealing engagement with the interior face of the air manifold 140 carried on each side of the air-track crawler by the support frame 140a within which the shafts 122 are rotatably supported.

As best shown in FIGS. 3 and 12, the seal formed by the expandable bellows seal 150 and Teflon face 151 between the drive chains 120 and the inner wall of the air flow manifold 140 prevents loss of air pressure from within the segmented air-track crawler when the former slides along the latter in its orbit. The T-shaped supports 130 carried by the drive chains 120 function to support the seal 150 so that the internal supporting air pressure will not displace the seal, causing a loss of air pressure.

As best shown in FIGS. 6 and 7, the air lube manifold 140 is formed with an internal wear resistant surface 141 through which perforations are formed to communicate with a plurality of air supply chambers with each of the arcuate rows of holes 142, 143 and 144, being supplied separately with an air supply through a pressure-flow rate sensitive air valve. Continuous air flow at a fixed pressure is supplied to the inner straight race of holes 145 to lubricate the sprocket controlled circular end races. The air from this straight race 145 contributes to the total air-track chamber pressure when the slide deviates. The air supply to each of the arcuate rows of holes 142, 143, and 144 (separately supplied to each) is such that the air valve supplies air flow at a high flow rate and higher pressure when back pressure is applied to the holes, while low back pressure (such as in the absence of contact with the Teflon sealing face 151 of the sliding seal 150), cuts off air flow through these outlets. Therefore, only those parts covered by the sliding seal 150 will be supplied with a continuous air flow at a high pressure and flow rate. Those holes which are not covered by the sliding seal, will thereby experience a slight air flow which will be effective to keep the ports open. In this manner, the face of the sliding seal 150 acting against the wear resistant seal face 140 will have an air-bearing formed therebetween, so that a high rate of air flow is supplied at high pressure through the arcuate row of holes 142, 143, and 144 in response to contact between the Teflon face 151 of the sliding seal 150 and the wear resistant surface 141. FIG. 13 shows an alternative to air lubricated sliding seal. The "Teflon" seal 151 is unchanged, but it contacts a vertical sheet of material 151a, a nylon, plastic composite, or other semi-rigid material which is also wear resistant. Internal air track pressure penetrates behind this 151a sheet to urge it against the seal 151 to assure sealing against leakage. This is a less expensive, less durable, version of tne air-track 100 first described. It is also simplified and less expensive by having an external skid rest 112a to prevent the segments 110 from crushing down on the chains and sprockets with the air pressure off at rest.

Preferably, there should be two levels of pressure to the air-track air supply, such as a dual air supply separately regulated in pressure and volume for the seal and the lift chamber. The air lubrication should be higher pressure than the lift air pressure supplied to the interior of the unit 100 through part 141a (FIG. 11). All air leaking inward from the sliding air bering will contribute to lift air volume and pressure, but that pressure may need to be varied as may the air air-track lift air operating pressure according to its task or when running full or empty. In this manner, the segmented air-track crawler units will be supplied with the desired air pressure internally and be effectively sealed during operation to prevent loss of the internal air pressure.

An alternative embodiment of another suitable air-track vehicle is as shown in FIGS. 14-16, wherein the cab portion 11a is articulated in relation to the carrier body 12a. As illustrated in this drawing, the air-track crawlers 100 are full width crawler belts which may be pivoted about their supports in the various directions illustrated by dashed lines to conform to changing grades, thereby illustrating the grade climbing capability of the vehicle. A suitable ball joint 15, about which the two portions of the vehicle are articulated, facilitates movement of the vehicle through various difficult terrain situations.

While the invention has been described with reference to preferred embodiments, it will be understood by those skilled in the art that various changes may be made and equivalents may be substituted for elements thereof without departing from the scope of the invention. In addition, any modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims.

What is claimed is:

1. A buoyant-wheel vehicle adapted for traversing various terrain comprising a vehicle body including means for controlling vehicle movement and function, said vehicle body being supported for traversing various terrain by a plurality of trapped air cushion crawlers, said trapped air cushion crawlers comprising a plurality of individual air pressurized inflatable casing units interconnected to each other and supported for movement in an endless path of movement forming an air-track crawler upon which the vehicle is supported.

said interconnected individual air-pressurized inflatable casing units are carried by a plurality of drive chains supported for movement in an endless path of movement upon sprockets rotatably supported on shafts which define the run length of said air-track crawler;

each one of said interconnected individual air-pressurized inflatable casing units includes an internal tension cable carried within said casing unit to keep the outermost portion thereof flat and prevent ballooning thereof when subjected to air pressure;

said vehicle further including skid rests supported from said drive chains and through bolted between individual casings to support said vehicle in the absence of pressurized air in said casings sufficient to support said vehicle thereon.

2. A buoyant-wheel vehicle adapted for traversing various terrain comprising a vehicle body including means for controlling vehicle movement and function, said vehicle body being supported for traversing various terrain by a plurality of trapped air cushion crawlers, said trapped air cushion crawlers comprising a plurality of individual air pressurized inflatable casing units interconnected to each other and supported for movement in an endless path of movement forming an air-track crawler upon which the vehicle is supported;

said interconnected individual air-ressurized inflatable casing units are carried by a plurality of drive chains supported for movement in an endless path of movement upon sprockets rotatably supported on shafts which define the run length of said air-track crawler;

each one of said interconnected individual air-pressurized inflatable casing units includes an internal tension cable carried within said casing unit to keep the outermost portion thereof flat and prevent ballooning thereof when subjected to air pressure;

the pressurized air for maintaining said interconnected individual air-pressurized inflatable casings pressurized is introduced through an air-lube manifold, said air-lube manifold including a manifold frame contiguous with said individual casings and having a first plurality of apertures formed therein for coupling a source of pressurized air into fluid communication with said individual casings for maintaining the air pressure within said casings through the apertures formed in said manifold frame.

3. The vehicle according to claim 2 wherein the surface of said manifold frame contiguous with said individual casings is formed with a low friction material thereon.

4. The vehicle according to claim 3 further including a bellows seal secured to and in sealing relationship with said drive chain and extending into sealing contact with said low friction material formed on said manifold frame.

5. The vehicle according to claim 4 wherein said manifold frame is formed with a second plurality of apertures for coupling a source of pressurized air against the sealing face of said bellows seal to form an air lubricated surface between said bellows seal and said low friction material on said manifold frame.

6. The vehicle according to claim 5 wherein the air flow through those apertures of said second plurality is greater when subjected to back pressure due to blockage of an aperture by said bellows seal than the air flow through those apertures of said second plurality when not subjected to such back pressure.

* * * * *